(12) United States Patent
Yuasa

(10) Patent No.: US 11,070,084 B2
(45) Date of Patent: Jul. 20, 2021

(54) VEHICLE

(71) Applicant: Toyota Jidosha Kabushiki Kaisha, Toyota (JP)

(72) Inventor: Hiroaki Yuasa, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 230 days.

(21) Appl. No.: 16/193,706

(22) Filed: Nov. 16, 2018

(65) Prior Publication Data

US 2019/0199133 A1 Jun. 27, 2019

(30) Foreign Application Priority Data

Dec. 27, 2017 (JP) .............................. JP2017-251618

(51) Int. Cl.
| | | |
|---|---|---|
| H02J 50/10 | (2016.01) | |
| H01F 38/14 | (2006.01) | |
| H02J 7/02 | (2016.01) | |
| B60H 1/00 | (2006.01) | |
| B62D 35/02 | (2006.01) | |
| B60L 53/12 | (2019.01) | |

(52) U.S. Cl.
CPC .......... *H02J 50/10* (2016.02); *B60H 1/00271* (2013.01); *B60H 1/00278* (2013.01); *B60L 53/12* (2019.02); *B62D 35/02* (2013.01); *H01F 38/14* (2013.01); *H02J 7/025* (2013.01)

(58) Field of Classification Search
CPC ................................. H02J 50/10; H02J 7/025; B60L 53/12; B60H 1/00271; B60H 1/00278; B62D 35/02; H01F 38/14
See application file for complete search history.

(56) References Cited

U.S. PATENT DOCUMENTS

| | | | |
|---|---|---|---|
| 9,545,850 B2 * | 1/2017 | Ichikawa | ................ H02J 50/40 |
| 2013/0127409 A1 | 5/2013 | Ichikawa | |
| 2013/0193749 A1 | 8/2013 | Nakamura et al. | |
| 2014/0305722 A1 * | 10/2014 | Ichikawa | ................ H02J 50/40 |
| | | | 180/65.31 |
| 2015/0008877 A1 | 1/2015 | Ichikawa et al. | |
| 2015/0015026 A1 | 1/2015 | Nojima et al. | |
| 2015/0069833 A1 | 3/2015 | Yuasa | |
| 2016/0052408 A1 | 2/2016 | Asai | |
| 2016/0250935 A1 | 9/2016 | Yuasa | |

(Continued)

FOREIGN PATENT DOCUMENTS

| | | |
|---|---|---|
| DE | 102014206739 A1 | 10/2015 |
| JP | 2011-218939 A | 11/2011 |

(Continued)

*Primary Examiner* — Bryan A Evans
(74) *Attorney, Agent, or Firm* — Dinsmore & Shohl LLP

(57) ABSTRACT

Provided is a vehicle including an undercover and a power receiving apparatus. The undercover is provided on the bottom surface of the vehicle. The undercover includes at least one air-flow regulating panel that regulates air flow flowing on the bottom surface side in the vehicle. The air-flow regulating panel is made of a metallic material having a lower electric resistance than that of iron. The power receiving apparatus is provided on the lower surface of the air-flow regulating panel. The power receiving apparatus is configured to wirelessly receive electric power from a power transmitting apparatus disposed outside the vehicle.

4 Claims, 8 Drawing Sheets

(56) References Cited

U.S. PATENT DOCUMENTS

2017/0021734 A1 1/2017 Birkholz et al.
2019/0341817 A1 11/2019 Asai

FOREIGN PATENT DOCUMENTS

| | | |
|---|---|---|
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2015056950 A | 3/2015 |
| JP | 2016163405 A | 9/2016 |
| JP | 6126013 B2 | 5/2017 |
| JP | 6135754 B2 | 5/2017 |
| KR | 1020130071764 A | 7/2013 |
| WO | 2015-154900 A1 | 10/2015 |
| WO | 2017203616A1 A1 | 11/2017 |

* cited by examiner

VEHICLE

CROSS-REFERENCE TO RELATED APPLICATIONS

This application claims priority to Japanese Patent Application No. 2017-251618 filed on Dec. 27, 2017, which is incorporated herein by reference in its entirety including the specification, drawings and abstract.

BACKGROUND

1. Technical Field

The present disclosure relates to a vehicle.

2. Description of Related Art

There have been proposed various wireless charging systems for charging batteries installed in vehicles. For example, a wireless charging system described in Japanese Patent No. 6126013 includes a vehicle that has a power receiving apparatus, and a power transmitting apparatus that wirelessly transmits electric power to the power receiving apparatus. The power receiving apparatus is provided at a rearward position in the vehicle.

SUMMARY

In the vehicle described in Japanese Patent No. 6126013, when the power receiving apparatus receives electric power from the power transmitting apparatus, an electromagnetic field is generated around the power receiving apparatus. In the vehicle, the power receiving apparatus is disposed at a rearward position in the vehicle, and the power receiving apparatus is provided on a lower surface of a rear floor panel. Commonly, a metallic material such as iron is adopted for the rear floor panel, and when a magnetic flux enters the rear floor panel, the rear floor panel is likely to have a high temperature due to the eddy current.

If the power receiving apparatus is disposed at a frontward position in the vehicle, an engine compartment is located near the power receiving apparatus. In the engine compartment, a suspension member and various mounted equipment are arranged. When a magnetic flux enters the suspension member and the various mounted equipment, temperatures of the suspension member and others might become high.

Because the power receiving apparatus is installed in a state of protruding downward from the bottom surface of the vehicle, air flow flowing on the bottom surface side in the vehicle is more likely to be disturbed due to the power receiving apparatus.

The present disclosure provides a vehicle that includes a power receiving apparatus and suppresses increase in temperature of members and equipment mounted in the vehicle, and also reduces disturbance of air flow flowing on the bottom surface side of the vehicle.

A vehicle according to one aspect of the present disclosure includes an undercover and a power receiving apparatus. The undercover is provided on a bottom surface of the vehicle. The undercover includes at least one air-flow regulating panel configured to regulate air flow flowing on the bottom surface side in the vehicle. The air-flow regulating panel is made from a metallic material having a lower electric resistance than that of iron. The power receiving apparatus is provided on a lower surface of the air-flow regulating panel. The power receiving apparatus is configured to wirelessly receive electric power from a power transmitting apparatus disposed outside the vehicle.

According to the vehicle of the above aspect, the air-flow regulating panel can suppress the electromagnetic field, which is generated around the power receiving apparatus when electric power is received, from entering the vehicle side. The air-flow regulating panel can suppress disturbance of the air flow flowing on the lower surface side in the vehicle. In addition, even when the magnetic flux enters the air-flow regulating panel, the air-flow regulating panel has a low electric resistance, and thus, it is possible to reduce increase in temperature of the air-flow regulating panel.

In the vehicle according to the above aspect, the undercover may include multiple air-flow regulating panels. Among the multiple air-flow regulating panels, the air-flow regulating panel on which the power receiving apparatus is disposed may have higher rigidity than rigidities of the other air-flow regulating panels.

According to the vehicle of this aspect, since the power receiving apparatus is provided on the air-flow regulating panel having higher rigidity, it is possible to suppress inconveniences, such as vibrations of the power receiving apparatus, caused by vibrations generated during the traveling of the vehicle or the like.

In the vehicle according to the above aspect, the undercover may include a resin member provided on a lower surface of the air-flow regulating panel on which the power receiving apparatus is disposed. The power receiving apparatus may include a coil unit, and an equipment unit provided on the lower surface of the air-flow regulating panel on which the power receiving apparatus is disposed in such a manner that the equipment unit is adjacent to the coil unit in the vehicle width direction. The resin member may be disposed on the opposite side of the equipment unit relative to the coil unit in the vehicle width direction.

According to the vehicle of this aspect, the resin member makes the part around the power receiving apparatus into a flat planar shape; thus, it is possible to suppress disturbance of the air flow flowing along the lower surface side of the power receiving apparatus. Furthermore, since the resin member does not hinder the magnetic flux flow, deterioration of the power receiving efficiency during the power receiving can be reduced.

In the vehicle according to the above aspect, the vehicle may further include a vehicle body that includes an occupant space and an engine compartment. The undercover may be disposed below the engine compartment.

The undercover according to this aspect can suppress generation of air flow flowing from the engine compartment into the lower surface side in the vehicle; therefore, it is possible to reduce disturbance of the air flow flowing on the lower surface side in the vehicle during the traveling of the vehicle.

In the vehicle according to the above aspect, the air-flow regulating panel may include a protective member disposed at a more frontward position than the power receiving apparatus in the vehicle. The lower surfaces of the air-flow regulating panels may have the same height in the height direction of the vehicle.

With the undercover of this aspect, when the air having flowed over the protective member flows in the rearward direction of the vehicle and flows along the lower surface of the power receiving apparatus, the air flow can be suppressed from being disturbed.

According to the vehicle of the present disclosure, in the vehicle in which the power receiving apparatus is installed, increase in temperature of the members and the equipment mounted in the vehicle is suppressed, while the air flow flowing on the bottom surface side in the vehicle is suppressed from being disturbed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
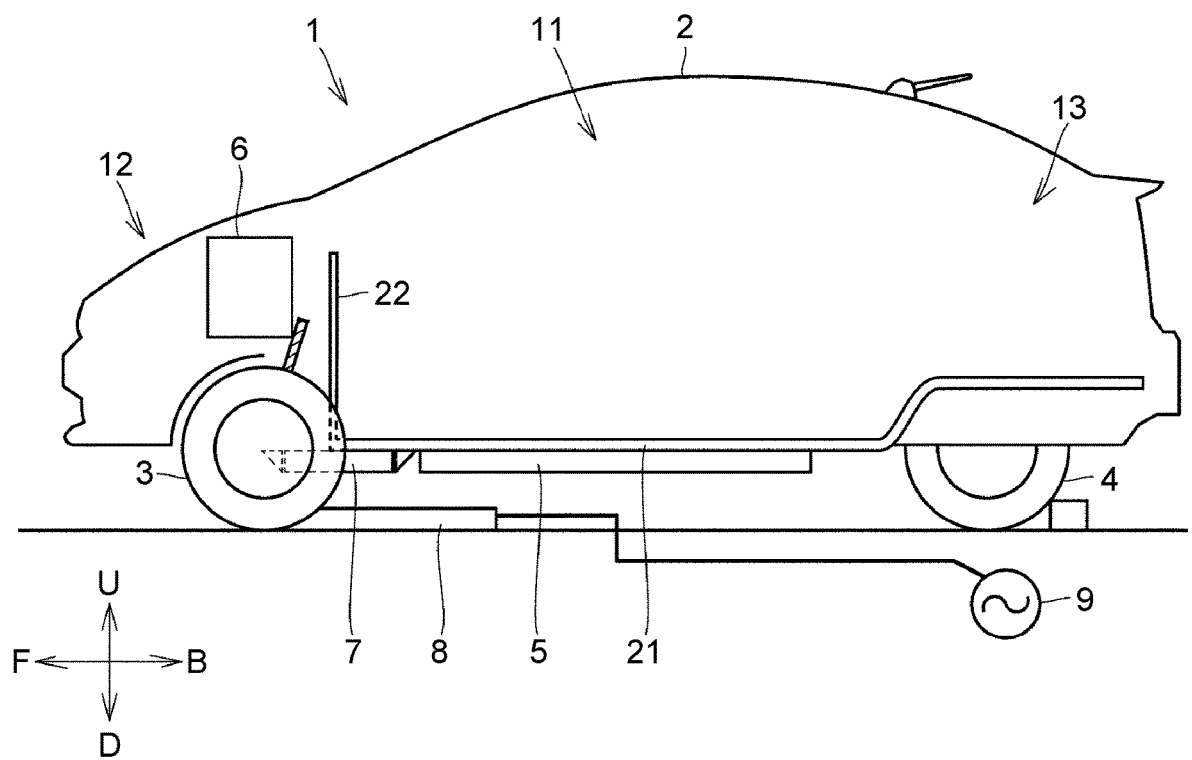
FIG. 1 is a side view schematically showing a vehicle.

Using FIG. 1 to FIG. 10, a vehicle 1 according to the present embodiment will be described. In configurations shown in FIG. 1 to FIG. 10, the same reference numerals are given to the same or substantially the same components, and duplicated description thereof is omitted. In FIG. 1, FIG. 2, FIG. 3, FIG. 5, FIG. 6, FIG. 10, F indicates a vehicle frontward direction, B indicates a vehicle rearward direction, U indicates a vehicle upward direction, D indicates a vehicle downward direction, R indicates a vehicle rightward direction, and L indicates a vehicle leftward direction, respectively.

FIG. 1 is a side view schematically showing the vehicle 1. The vehicle 1 includes a vehicle body 2, front wheels 3, rear wheels 4, a battery 5, a driving system 6, and a power receiving apparatus 7.

The front wheels 3 are disposed more frontward than the center in the front-rear direction of the vehicle 1, and the rear wheels 4 are disposed more rearward than the center in the front-rear direction of the vehicle 1.

The driving system 6 includes a rotary electric machine 50, a PCU (power control unit) 51, and an oil pan 52, for example. The PCU includes an inverter and a converter. The PCU boosts DC power supplied from the battery 5, and converts this to AC power, and then supplies this to the rotary electric machine. The rotary electric machine is driven with the supplied AC power so as to rotate the front wheels 3 that are driving wheels. The rotary electric machine also functions as an electric power generator.

The power receiving apparatus 7 is provided on the bottom surface side in the vehicle 1. The power receiving apparatus 7 is configured to be able to wirelessly receive electric power from a power transmitting apparatus 8 disposed outside the vehicle 1. The power transmitting apparatus 8 is connected to a power source 9.

An occupant space 11, an engine compartment 12, and a luggage room 13 are formed in the vehicle body 2.

The occupant space 11 is a space in which a driver or occupants sit. Front seats and rear seats are provided in the occupant space 11. The engine compartment 12 is formed in front of the occupant space 11. The driving system 6 is installed in the engine compartment 12. The luggage room 13 is formed behind the occupant space 11. Luggage and others are accommodated in the luggage room 13, for example.

Figure 2:
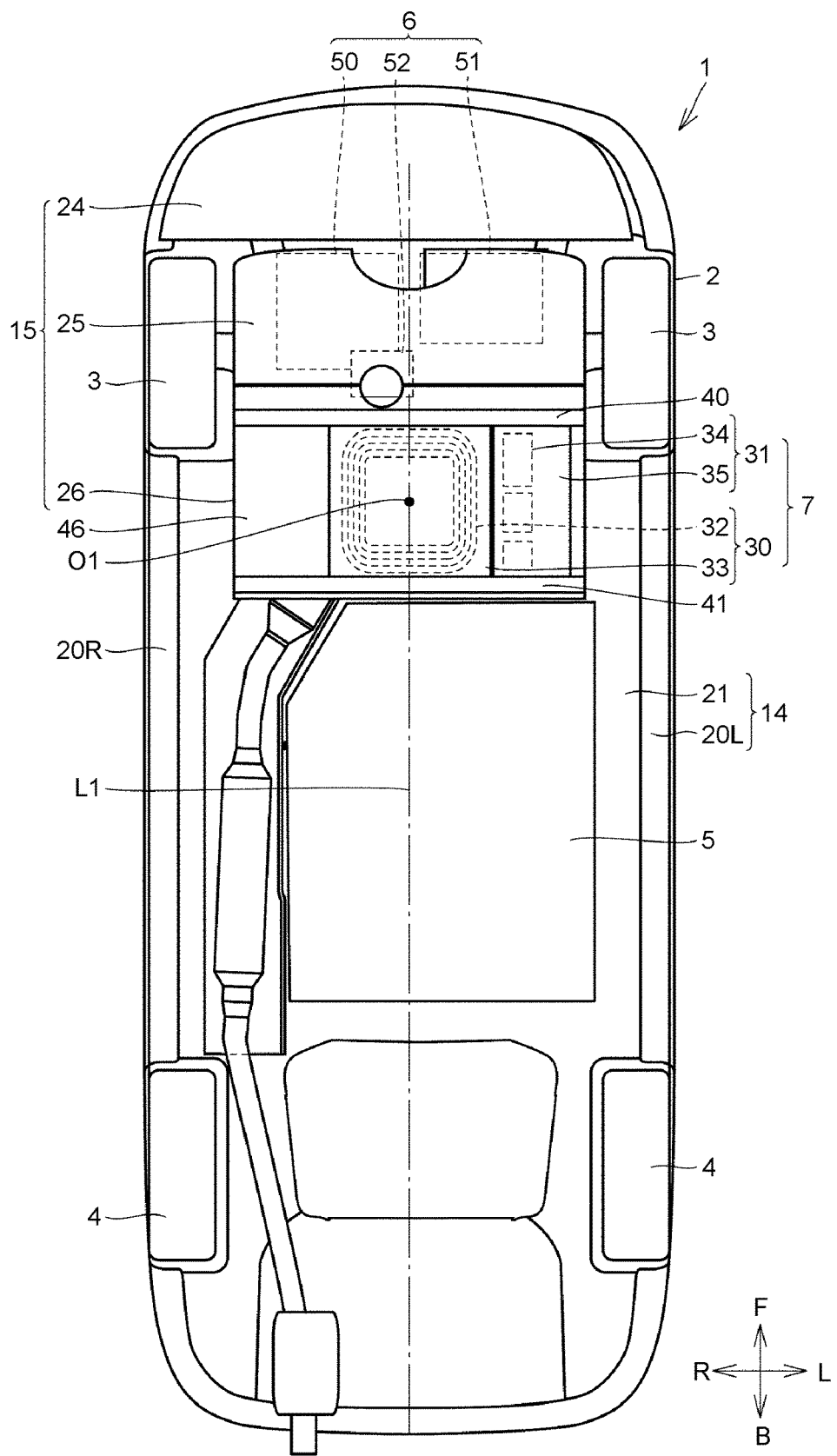
FIG. 2 is a bottom view showing a bottom surface of the vehicle.

FIG. 2 is a bottom view showing the bottom surface of the vehicle 1. The vehicle body 2 includes a frame 14, an undercover 15, and a suspension member.

The frame 14 includes side members 20L, 20R, a floor panel 21, and a not-illustrated cross member. The side members 20L, 20R are disposed with a distance therebetween in the width direction of the vehicle 1. The side members 20L, 20R are each formed so as to extend in the front-rear direction of the vehicle 1. The floor panel 21 is disposed on top surfaces of the side members 20L, 20R, and the floor panel 21 is formed of iron or an iron alloy.

The floor panel 21 forms a lower surface of the luggage room 13 and a lower surface of the occupant space 11. The battery 5 is provided on a bottom surface of the floor panel 21.

As shown in FIG. 1, a partitioning wall 22 is formed at a front end of the floor panel 21, and this partitioning wall 22 partitions the engine compartment 12 from the occupant space 11. Therefore, the floor panel 21 does not reach the bottom surface of the engine compartment 12.

With reference to FIG. 2 again, the undercover 15 is provided under the engine compartment 12. The undercover 15 includes a first air-flow regulating panel 24, a second air-flow regulating panel 25, and a third air-flow regulating panel 26. The second air-flow regulating panel 25 and the third air-flow regulating panel 26 are each formed of a metallic material having a lower electric resistance than that of iron. Specifically, the second air-flow regulating panel 25 and the third air-flow regulating panel 26 are each formed of any one of aluminum, an aluminum alloy, copper, silver, gold, zinc, and brass, or an alloy thereof. The first air-flow regulating panel 24 may be formed of resin, or may be formed of metal having a lower electric resistance than that of iron.

Among the first air-flow regulating panel 24, the second air-flow regulating panel 25, and the third air-flow regulating panel 26, the first air-flow regulating panel 24 is located at a most frontward position in the vehicle 1. The first air-flow regulating panel 24 is formed so as to extend in the width direction of the vehicle 1. The right end of the first air-flow regulating panel 24 is located in front of the right front wheel 3, and the left end of the first air-flow regulating panel 24 is located in front of the left front wheel 3. The first air-flow regulating panel 24 is gradually inclined downward as the first air-flow regulating panel 24 extends from the front end toward the rear end of the vehicle 1, and the lower surface of the first air-flow regulating panel 24 is a flat planner inclined surface.

The second air-flow regulating panel 25 is disposed behind the first air-flow regulating panel 24. The second air-flow regulating panel 25 is disposed between the pair of front wheels 3 arranged on the right and the left. Respective right and left ends of the second air-flow regulating panel 25 are located near the right and left front wheels 3.

The third air-flow regulating panel 26 is located behind the second air-flow regulating panel 25. The length of the third air-flow regulating panel 26 in the width direction of the vehicle 1 is the same or substantially the same as the length of the second air-flow regulating panel 25.

The driving system 6 is disposed above the undercover 15, and a lower surface of the driving system 6 is covered by the undercover 15. In this example shown in FIG. 2, the lower surface of the driving system 6 is covered by the second air-flow regulating panel 25.

The power receiving apparatus 7 is provided on the lower surface of the third air-flow regulating panel 26. The power receiving apparatus 7 includes a coil unit 30 and an equipment unit 31.

The coil unit 30 includes a power receiving coil 32 and a case 33. The power receiving coil 32 is formed so as to surround a winding axis O1 extending in the height direction by a coil wire. The case 33 is formed of resin or the like, for example. The coil unit 30 is disposed at the center in the width direction of the vehicle 1. Specifically, defining an imaginary line passing through the center in the width direction of the vehicle 1 as an imaginary line L1, if the vehicle 1 is seen from below in plan view, the power receiving apparatus 7 is disposed such that the power receiving coil 32 overlaps the imaginary line L1. To be more specific, if the vehicle 1 is seen from below, the power receiving apparatus 7 is disposed such that the winding axis O1 overlaps the imaginary line L1.

The equipment unit 31 includes multiple equipment 34 and a case 35. The multiple equipment 34 includes rectifiers, filters, etc. The case 35 includes a metallic cover disposed on the lower surface side, and a case body made from resin disposed on the upper surface of this metallic cover.

The equipment unit 31 is arranged at a position adjacent to the coil unit 30 in the width direction of the vehicle 1. Specifically, the equipment unit 31 is arranged at a position adjacent to the coil unit 30 on the left in the vehicle 1.

Figure 3:
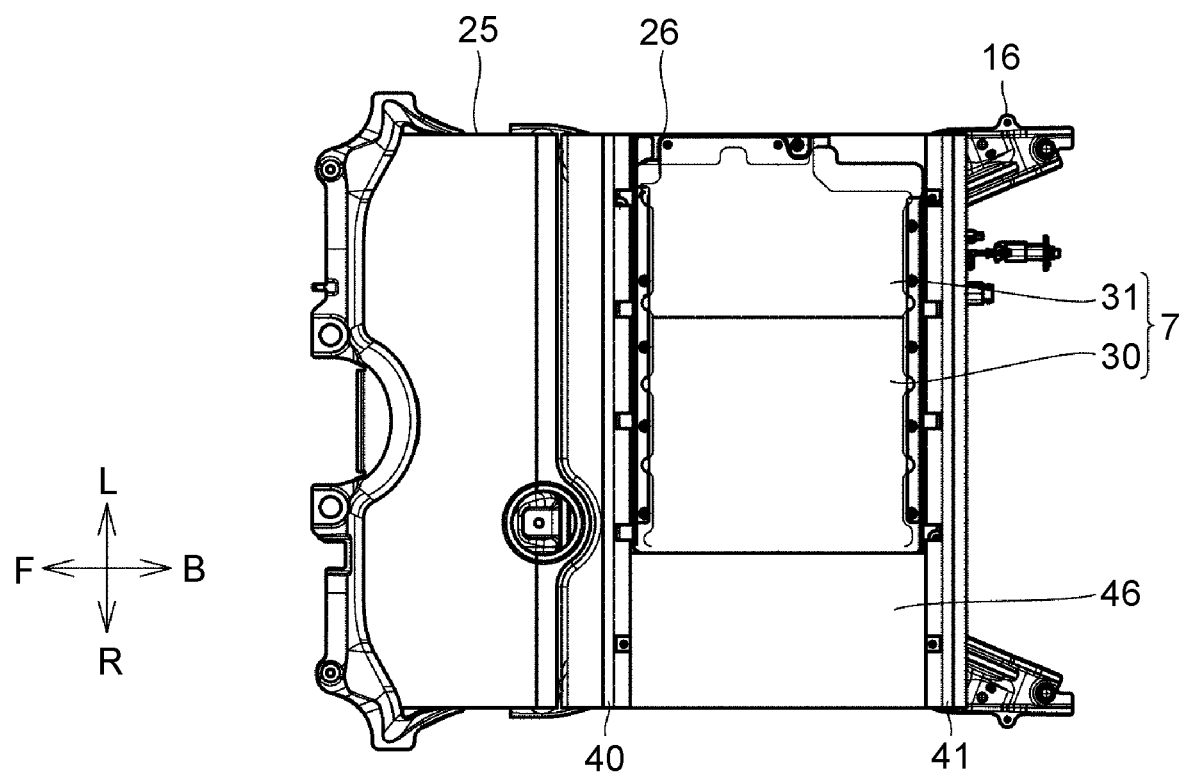
FIG. 3 is a plan view showing air-flow regulating panels.
Figure 4:
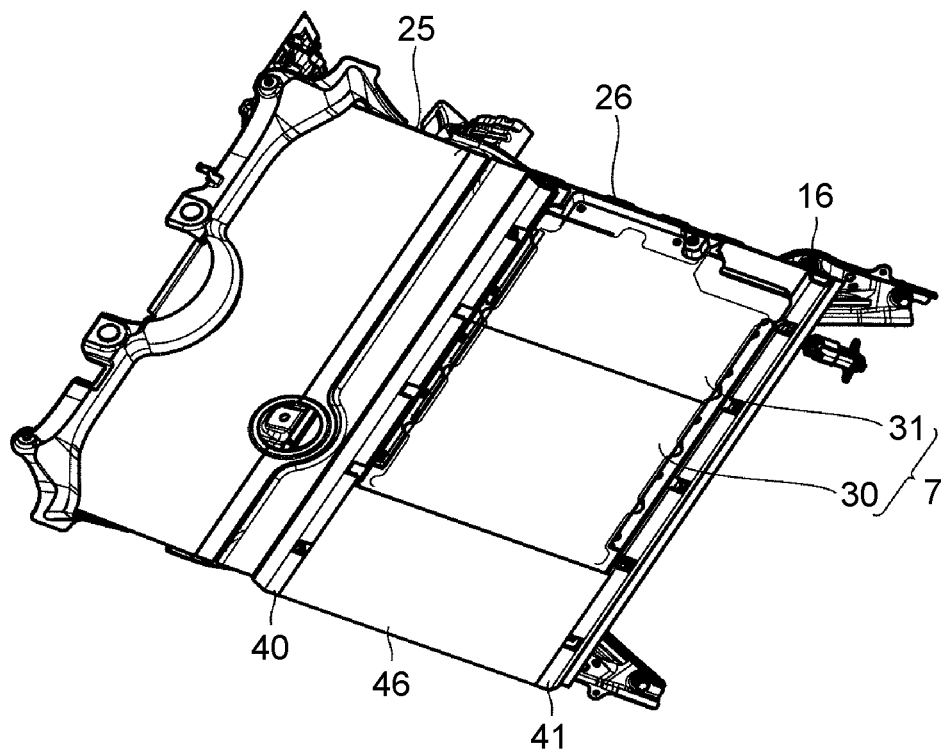
FIG. 4 is a perspective view showing the air-flow regulating panels.

FIG. 3 is a plan view showing the second air-flow regulating panel 25 and the third air-flow regulating panel 26; and FIG. 4 is a perspective view showing the second air-flow regulating panel 25 and the third air-flow regulating panel 26. The lower surfaces of the third air-flow regulating panel 26 and the second air-flow regulating panel 25 extend in substantially the horizontal direction, and the third air-flow regulating panel 26 is provided with protective members 40, 41. The protective members 40, 41 are each arranged at positions adjacent to the power receiving apparatus 7 in the front-rear direction. The protective members 40, 41 are formed to extend in the width direction of the vehicle 1.

The protective members 40, 41 are provided so as to protrude downward from the lower surface of the third air-flow regulating panel 26; and in the height direction, the lower ends of the protective members 40, 41 are located at substantially the same position as the lower surface of the power receiving apparatus 7.

A part of the third air-flow regulating panel 26 on the opposite side of the equipment unit 31 relative to the coil unit in the width direction of the vehicle 1 is provided with a resin member 46 in a flat platy shape. In the height direction, the lower surface of the resin member 46 substantially coincides with the lower surface of the power receiving apparatus 7. Thus, the lower surface of the resin member 46 and the lower surface of the power receiving apparatus 7 form a flat surface.

Figure 5:
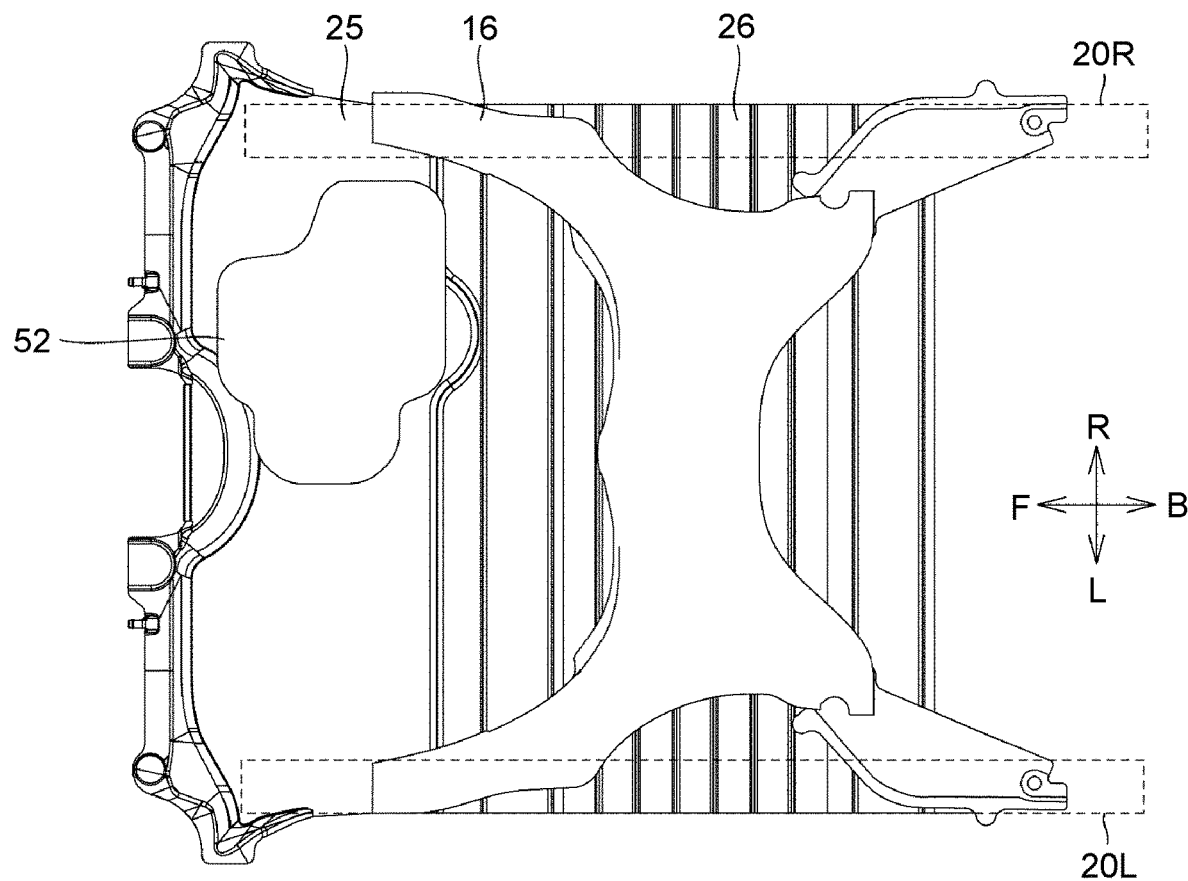
FIG. 5 is a plan view of the air-flow regulating panels and a suspension member as seen from above in plan view.

FIG. 5 is a plan view of the second air-flow regulating panel 25, the third air-flow regulating panel 26, and a suspension member 16, as seen from above in plan view. The suspension member 16 is provided on the upper surface of the third air-flow regulating panel 26. The suspension member 16 is formed of a metallic material such as iron. The second air-flow regulating panel 25 and the third air-flow regulating panel 26 are fixed to the suspension member 16.

As shown in FIG. 5, when the suspension member 16, the second air-flow regulating panel 25, and the third air-flow regulating panel 26 are seen from above in plan view, the lower surface of the suspension member 16 is covered by the second air-flow regulating panel 25 and the third air-flow regulating panel 26.

Figure 6:
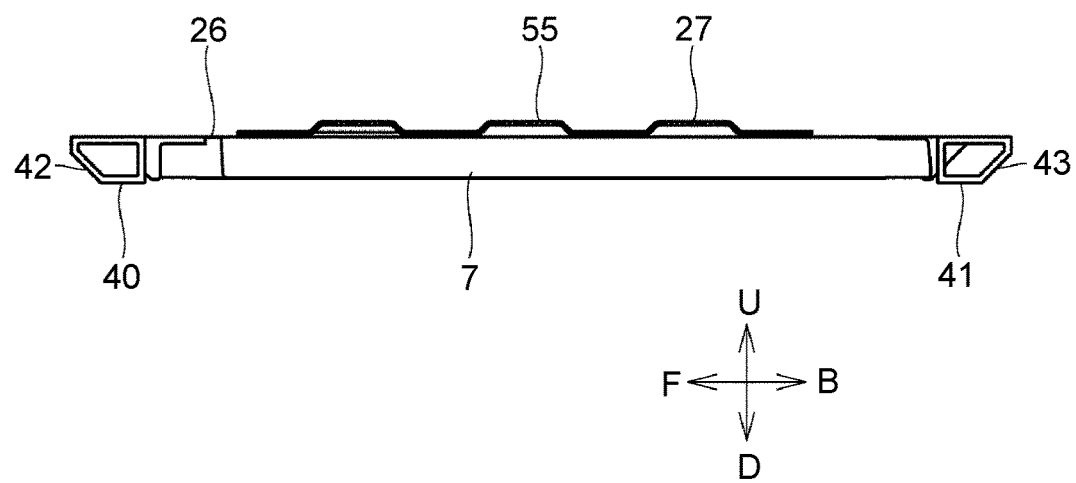
FIG. 6 is a side view showing the air-flow regulating panel and a power receiving apparatus.

FIG. 6 is a side view showing the third air-flow regulating panel 26 and the power receiving apparatus 7. A reinforcement plate 27 is attached to the upper surface of the third air-flow regulating panel 26. The reinforcement plate 27 is formed with multiple ribs 55 each extending in the width direction of the vehicle 1. The multiple ribs 55 are formed with intervals in the front-rear direction of the vehicle 1, and each rib 55 is so formed as to swell upward.

These multiple ribs 55 allow the reinforcement plate 27 to have higher rigidity, and thus the rigidity of the third air-flow regulating panel 26 with the reinforcement plate 27 is higher than those of the first air-flow regulating panel 24 and the second air-flow regulating panel 25. Therefore, the third air-flow regulating panel 26 is less deformable than the first air-flow regulating panel 24 and the second air-flow regulating panel 25.

Because the power receiving apparatus 7 is fixed to the third air-flow regulating panel 26 having high rigidity, during traveling of the vehicle 1, vibrations of the third air-flow regulating panel 26 and the power receiving apparatus 7 can be reduced. Accordingly, it is possible to suppress generation of vibration sounds and strange noises during traveling of the vehicle 1.

The protective member 40 is formed with an inclined surface 42 gradually inclined downward as the protective member 40 extends from the front end side toward the rear end side in the vehicle 1. The protective member 41 is formed with an inclined surface 43 gradually inclined upward as the protective member 41 extends from the front end side toward the rear end side of the vehicle 1.

How the power receiving apparatus 7 receives electric power from the power transmitting apparatus 8 in the above-configured vehicle 1 will be explained. When the power transmitting apparatus 8 receives electric power from the power source 9, an electromagnetic field is generated around the power transmitting apparatus 8, and the power receiving apparatus 7 receives electric power through this electromagnetic field. When the power receiving apparatus 7 receives electric power, current flows through the power receiving coil 32 shown in FIG. 2, and an electromagnetic field is also generated around the power receiving coil 32.

At this time, a magnetic flux enters the third air-flow regulating panel 26 provided with the power receiving apparatus 7. The third air-flow regulating panel 26 is formed of a metallic material having a lower electric resistance than that of iron. Therefore, even if the magnetic flux enters the third air-flow regulating panel 26 and the eddy current flows through the lower surface of the third air-flow regulating panel 26, the third air-flow regulating panel 26 can be suppressed from heating.

In addition, an electromagnetic field is generated by the eddy current flowing through the lower surface of the third air-flow regulating panel 26. This electromagnetic field is distributed so as to reduce an amount of magnetic flux to enter. As a result, part of the magnetic flux to enter the third air-flow regulating panel 26 is reflected by the lower surface of the third air-flow regulating panel 26.

Accordingly, the amount of magnetic flux that pass through the third air-flow regulating panel 26 and then enters the engine compartment 12 can be reduced. Since the magnetic flux that enters the engine compartment 12 can be reduced, it is possible to suppress increase in the temperatures of the driving system 6, the suspension member 16, and others due to the entry of the magnetic flux into the driving system 6, the suspension member 16, and others. The lower surface of the oil pan 52 is provided with a lid used for oil exchange. A hole through which the lid of the oil pan 52 is allowed to be exposed is provided at a boundary part between the second air-flow regulating panel 25 and the third air-flow regulating panel 26. The lid of the oil pan 52 is made of aluminum or an aluminum alloy, and thus the lid is suppressed from having a high temperature even when the magnetic flux enters the lid.

In addition, by forming the second air-flow regulating panel 25 of a metallic material having a lower electric resistance than that of iron, it is possible to suppress the magnetic flux from entering the driving system 6 through the second air-flow regulating panel 25.

The amount of magnetic flux reaching the first air-flow regulating panel 24 during the electric power receiving is small; therefore, even in the case of forming the first air-flow regulating panel 24 of resin, the amount of magnetic flux that enters the driving system 6 through the first air-flow regulating panel 24 is small. In the meantime, weight reduction of the first air-flow regulating panel 24 can be promoted by forming the first air-flow regulating panel 24 of resin.

The lower surface of the first air-flow regulating panel 24 is a flat planner inclined surface; therefore, during the traveling of the vehicle 1, the air flow flowing along the lower surface of the first air-flow regulating panel 24 is suppressed from being disturbed.

Furthermore, the lower surface of the second air-flow regulating panel 25 is a flat planner inclined surface extending in the horizontal direction. Hence, during the traveling of the vehicle 1, air flowing on the bottom surface side in the vehicle 1 flows easily in a regulated manner. Accordingly, it is possible to enhance the aerodynamic performance of the vehicle 1.

In particular, the second air-flow regulating panel 25 is disposed on the lower surface of the engine compartment 12, and the second air-flow regulating panel 25 suppresses air blow from the engine compartment 12. Therefore, the second air-flow regulating panel 25 suppresses generation of disturbance of the air flow flowing on the lower side in the vehicle 1.

The lower surface of the third air-flow regulating panel 26 is also a flat planner surface extending in the horizontal direction. Thus, when the air flows along a part of the lower surface of the third air-flow regulating panel 26, the part located more frontward than the protective member 40, disturbance of the air flow can be suppressed. Accordingly, the functions of the third air-flow regulating panel 26 include a shield function and an air-flow regulating function.

In FIG. 4 and FIG. 6, the power receiving apparatus 7 is provided on the lower surface of the third air-flow regulating panel 26. The power receiving apparatus 7 is provided so as to protrude more downward than the lower surface of the third air-flow regulating panel 26, while the protective member 40 is provided in front of the power receiving apparatus 7, and the protective member 40 is formed with the inclined surface 42.

Accordingly, while the vehicle 1 is traveling, air colliding against the protective member 40 is likely to flow along the inclined surface 42, to thereby suppress disturbance of the air flow.

The position of the lower surface of the protective member 40, the position of the lower surface of the power receiving apparatus 7, and the position of the lower surface of the resin member 46 coincide or substantially coincide with each other in the height direction. Hence, the air having flowed over the protective member 40 flows toward the rearward direction of the vehicle 1, and when the air flows along the lower surfaces of the power receiving apparatus 7 and the resin member 46, the air flow is suppressed from being disturbed.

That the lower surface of the resin member 46 substantially coincides with the lower surface of the power receiving apparatus 7 means that amount of deviation in the height direction between these lower surfaces is not more than 1 cm, for example.

The resin member 46 is formed of resin or the like, and a magnetic resistance of resin is substantially the same as that of the air; therefore, while the power receiving apparatus 7 is receiving electric power, the resin member 46 can be suppressed from hindering the magnetic flux flow.

In the present embodiment, the equipment unit 31 is provided on the left side of the coil unit 30, and the resin member 46 is provided on the right side of the coil unit 30; however, the equipment unit 31 may be provided on the right side of the coil unit 30, and the resin member 46 may be provided on the left side of the coil unit 30.

In addition, in FIG. 1, the lower surface of the battery 5 coincides or substantially coincides with the lower surface of the power receiving apparatus 7 in the height direction. Accordingly, when the air having flowed along the lower surface of the power receiving apparatus 7 flows along the lower surface of the battery 5, the air flow is suppressed from being disturbed.

In this manner, since the air flow is suppressed from being disturbed on the lower surface side in the vehicle 1, it is possible to promote enhancement of the traveling performance of the vehicle 1.

Figure 7:
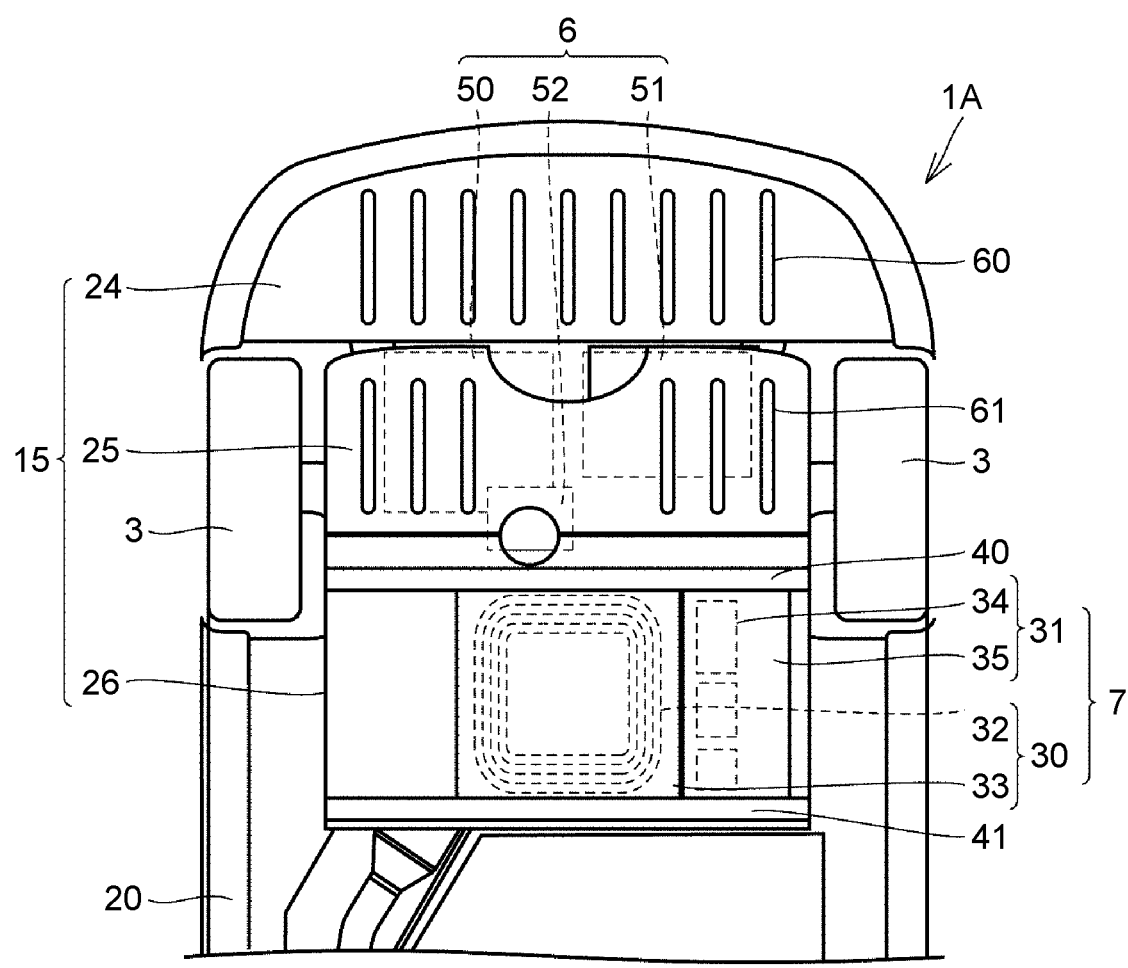
FIG. 7 is a bottom view showing a vehicle according to a first modification.

FIG. 7 is a bottom view showing a vehicle 1A according to the first modification. The first air-flow regulating panel 24 of the vehicle 1A is provided with multiple air-flow regulating fins 60, and the second air-flow regulating panel 25 is provided with multiple air-flow regulating fins 61.

While the vehicle 1 is traveling, the air flowing along the lower surfaces of the first air-flow regulating panel 24 and the second air-flow regulating panel 25 is regulated by the air-flow regulating fins 60, 61, to thereby promote reduction of the air resistance.

Figure 8:
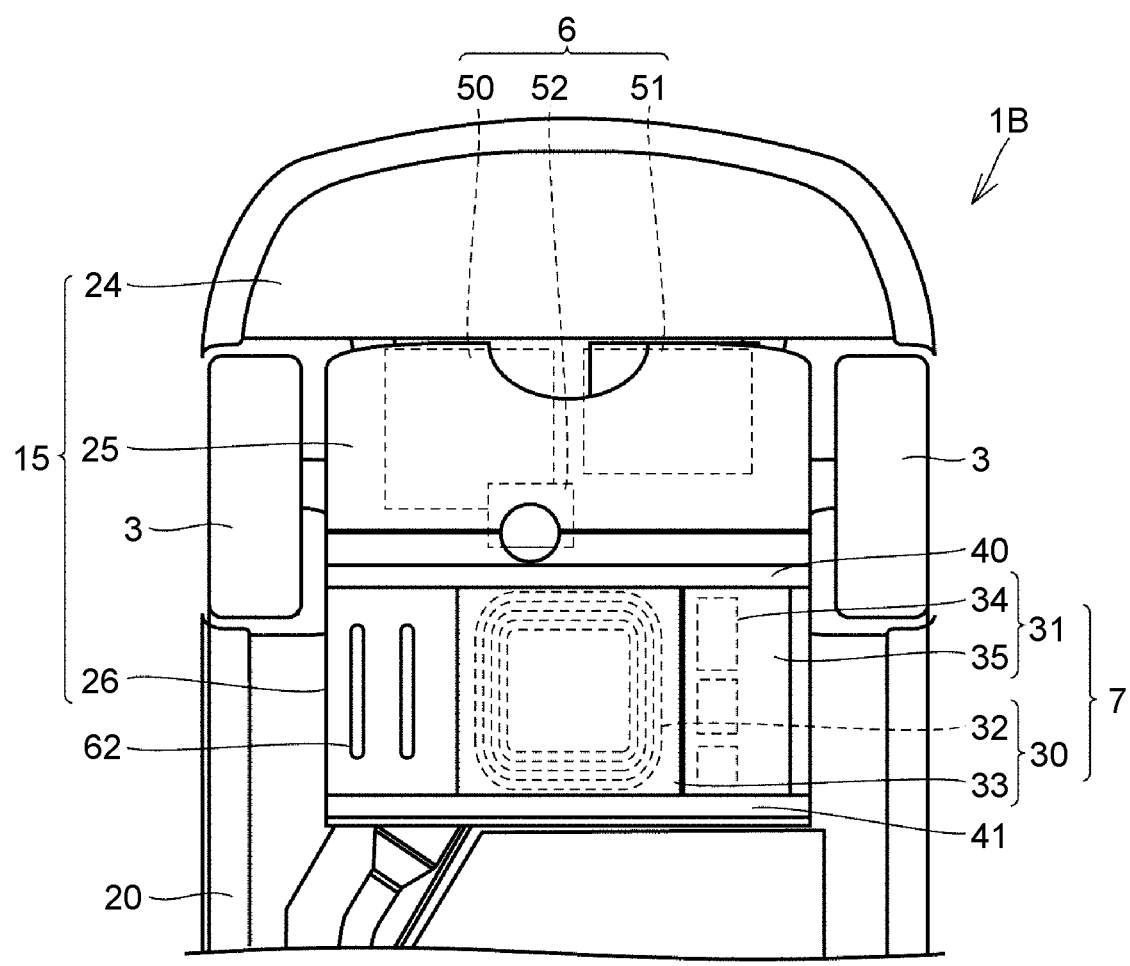
FIG. 8 is a bottom view showing a vehicle according to a second modification.

FIG. 8 is a bottom view showing a vehicle 1B according to the second modification. The vehicle 1B is not provided with the resin member 46 that is provided in the vehicle 1 according to the first embodiment. In the meantime, a part of the lower surface of the third air-flow regulating panel 26 on the opposite side of the equipment unit 31 relative to the coil unit 30 in the width direction of the vehicle 1 is provided with air-flow regulating fins 62.

Accordingly, the air having flowed over the protective member 40 is regulated by the air-flow regulating fins 62, to thereby suppress the air having passed over the protective member 40 from being disturbed.

Note that the resin member 46 and the air-flow regulating fins 62 are optional components; therefore, neither of the resin member 46 and the air-flow regulating fins 62 may be provided.

Figure 9:
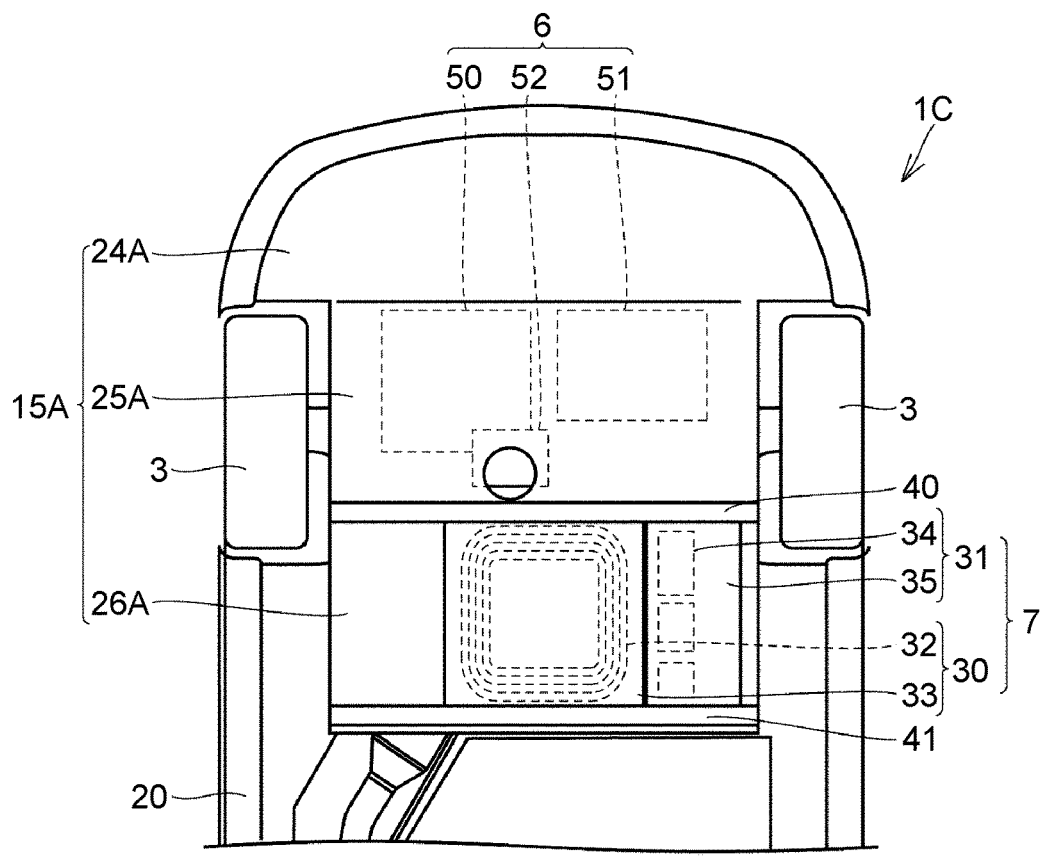
FIG. 9 is a bottom view showing a third modification.

FIG. 9 is a bottom view showing the third modification. A vehicle 1C shown in FIG. 9 includes an undercover 15A. The undercover 15A includes a first air-flow regulating panel 24A, a second air-flow regulating panel 25A, and a third air-flow regulating panel 26A. The first air-flow regulating panel 24A and the second air-flow regulating panel 25A are integral with each other, and the second air-flow regulating panel 25A and the third air-flow regulating panel 26A are formed so as to be integrated with each other. The first air-flow regulating panel 24A, the second air-flow regulating panel 25A, and the third air-flow regulating panel 26A are formed of metal having a lower electric resistance than that of iron.

Figure 10:
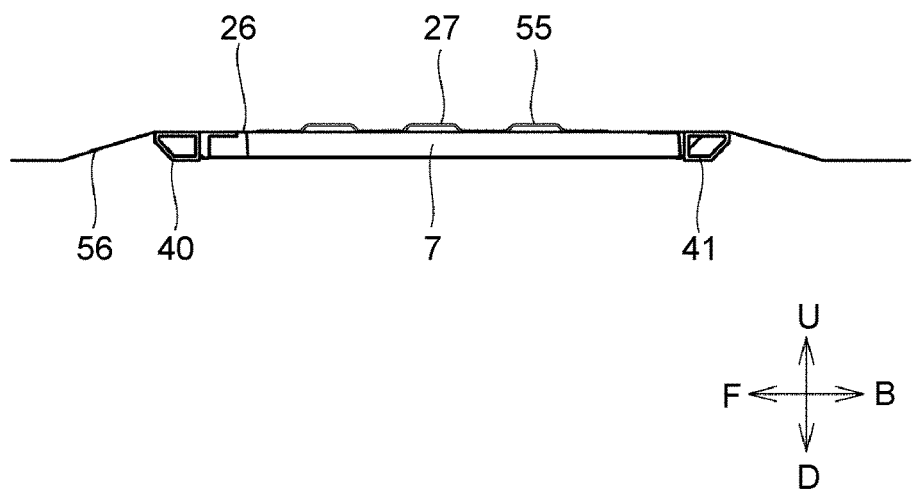
FIG. 10 is a sectional view showing a fourth modification.

FIG. 10 is a sectional view showing the fourth modification. In an example shown in FIG. 10, the third air-flow regulating panel 26 is formed with a recess 56, and the power receiving apparatus 7 is disposed in this recess 56. In the example shown in FIG. 10, downward protrusion of the power receiving apparatus 7 can be avoided to thereby reduce deterioration of the aerodynamic performance. In addition to this, the power receiving apparatus 7 can be prevented from coming into contact with a foreign substance located on the ground. An inner surface of the recess 56 includes a top surface to which the power receiving apparatus 7 is fixed, and an inner circumferential surface extending downward from an outer periphery of the top surface. The top surface is formed in a flat planner shape. The inner circumferential surface is formed in such a manner as to open wider as it goes downward. Since the inner circumferential surface is formed to open wider in the downward direction, it is possible to suppress the magnetic flux generated during the power receiving from entering the inner circumferential surface.

The embodiments disclosed herein are merely illustrative in all aspects and should not be recognized as being restrictive. The scope of the present disclosure is defined not by the aforementioned embodiments, but by the scope of the claims, and is intended to include meaning equivalent to the scope of the claims and all modifications within the scope.

What is claimed is:

1. A vehicle comprising:
   an undercover provided on a bottom surface of the vehicle, the undercover including multiple air-flow regulating panels configured to regulate air flow flowing on a bottom surface side in the vehicle, the multiple air-flow regulating panels being made of a metallic material having a lower electric resistance than that of iron; and
   a power receiving apparatus provided on a lower surface of one of multiple the air-flow regulating panels, the power receiving apparatus being configured to wirelessly receive electric power from a power transmitting apparatus disposed outside the vehicle,
   wherein, among the multiple air-flow regulating panels, the air-flow regulating panel on which the power receiving apparatus is disposed has higher rigidity than rigidities of the other air-flow regulating panels.

2. The vehicle according to claim 1, wherein:
   the undercover includes a resin member provided on a lower surface of the air-flow regulating panel on which the power receiving apparatus is disposed;
   the power receiving apparatus includes a coil unit, and an equipment unit provided on the lower surface of the air-flow regulating panel on which the power receiving apparatus is disposed in such a manner that the equipment unit is adjacent to the coil unit in a vehicle width direction; and
   the resin member is disposed on an opposite side of the equipment unit relative to the coil unit in the vehicle width direction.

3. The vehicle according to claim 1, further comprising a vehicle body that includes an occupant space and an engine compartment, wherein the undercover is disposed below the engine compartment.

4. The vehicle according to claim 1, wherein:
   the air-flow regulating panel on which the power receiving apparatus is disposed includes a protective member disposed at a more frontward position than the power receiving apparatus in the vehicle; and
   lower surfaces of the air-flow regulating panel on which the power receiving apparatus is disposed have the same height in a height direction of the vehicle.

* * * * *